Nov. 9, 1943.  E. E. HALLDEN  2,334,089
DRILL
Filed Nov. 6, 1939  2 Sheets-Sheet 1
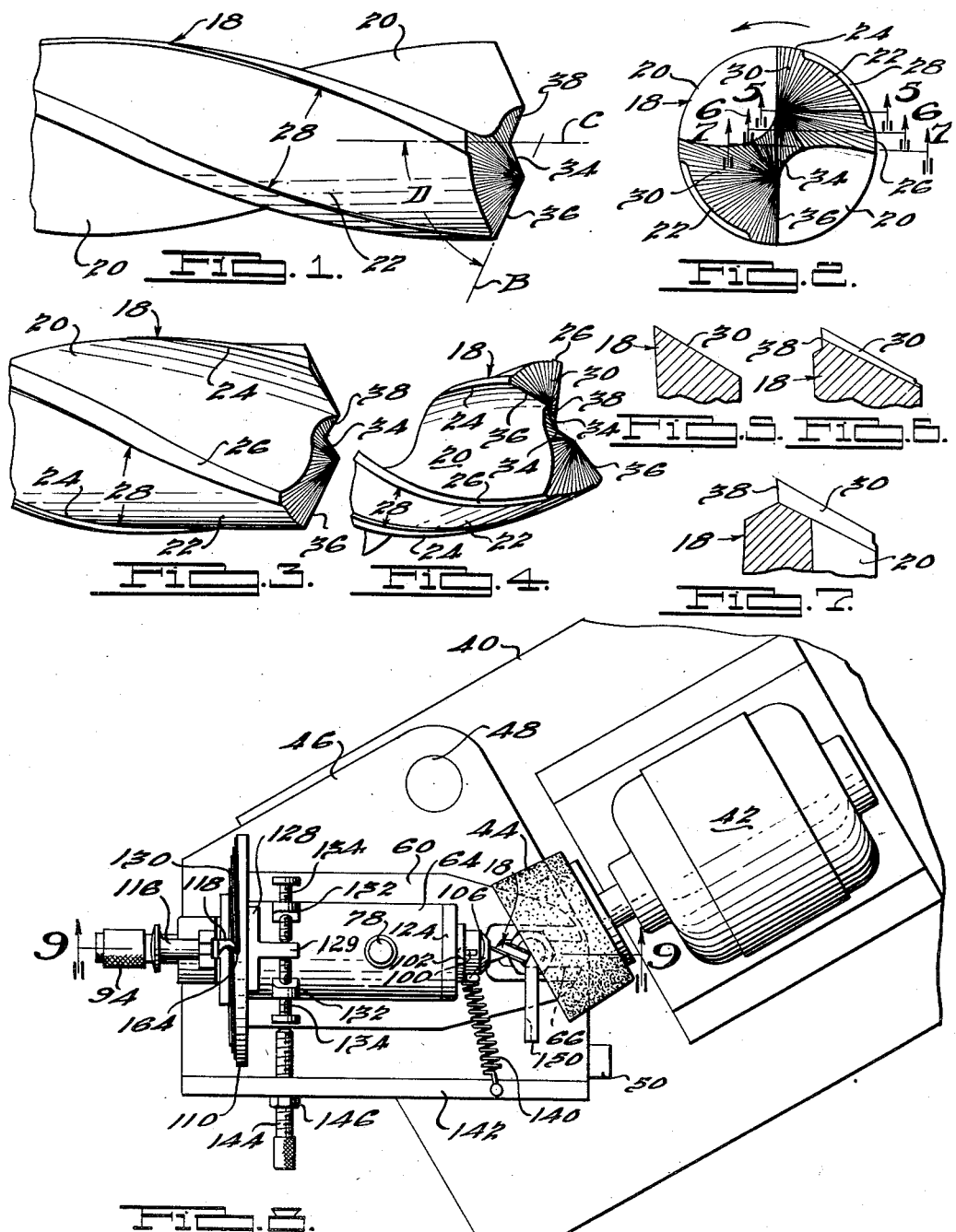
INVENTOR
Erik E. Hallden.
BY
Harness, Dickey & Pierce.
ATTORNEYS.

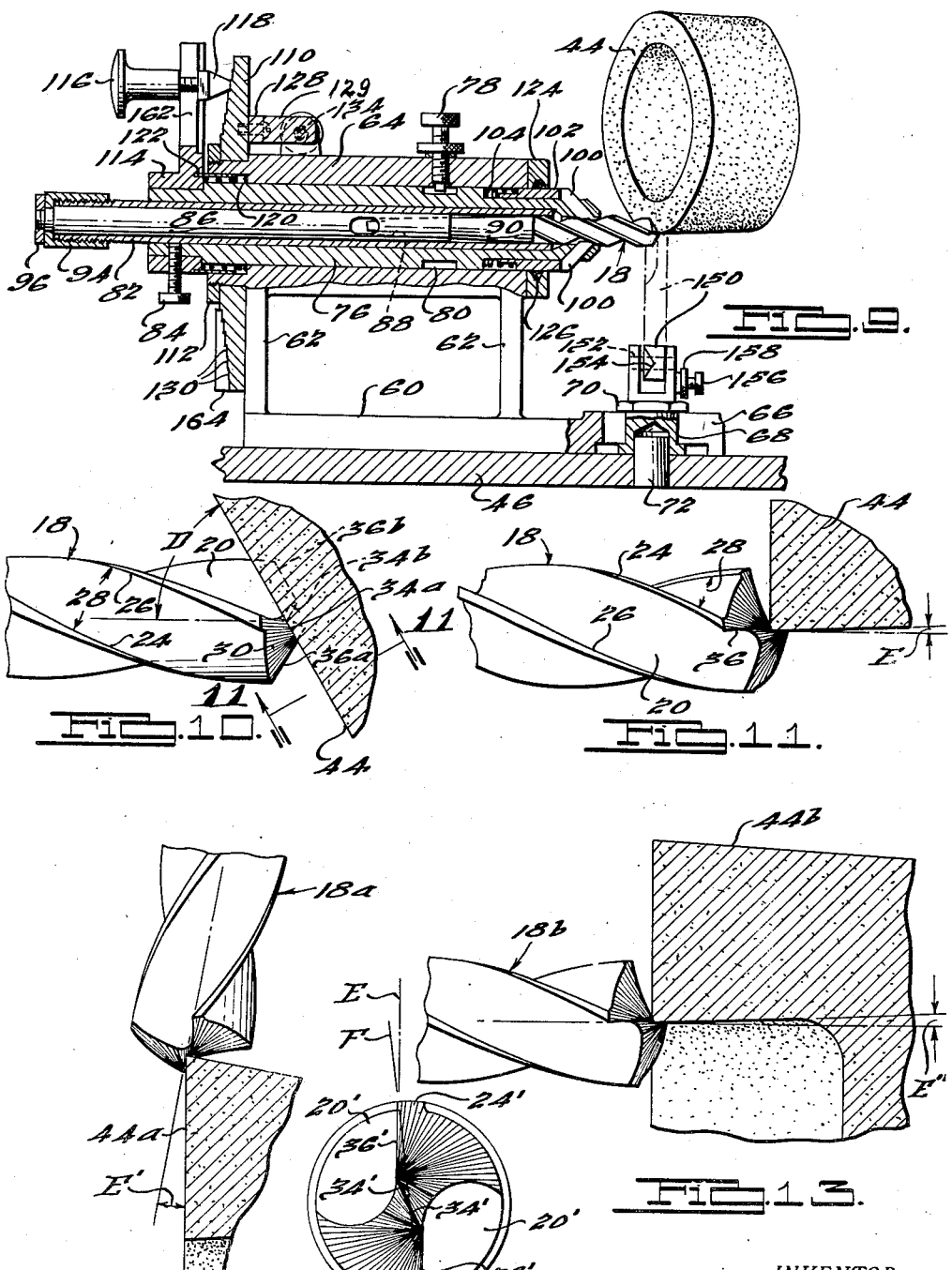

Patented Nov. 9, 1943

2,334,089

UNITED STATES PATENT OFFICE 2,334,089

DRILL

Erik E. Hallden, Detroit, Mich.

Application November 6, 1939, Serial No. 303,012

8 Claims. (Cl. 77—70)

This invention relates to drills and particularly to drills of the type commonly employed for drilling holes in metallic objects and is particularly adaptable for use in so-called twist drills, the principal object being the provision of a drill of the type described that will drill easier than conventional drills, that is, it will require less torque and less feed pressure than drills conventionally employed in performing the same drilling operation.

Objects of the invention include the provision of a twist drill provided with one or more flutes and in which the effective cutting edge of the drill extends completely through the center of the drill; the provision of a twist drill having a plurality of cutting edges all of which are fully effective for cutting purposes from the periphery to the actual axis of the drill; the provision of a twist drill having a cutting edge extending from the periphery of the drill to the actual axis of the drill and in which the cutting clearance on the cutting edge does not diminish as the axis of the drill is approached; the provision of a twist drill having an inverted central portion serving to carry the cutting edges of the drill to the actual axis of the drill; the provision of a twist drill having an inverted V central portion providing a positive cutting edge extending completely to the axis of the drill; and the provision of a twist drill having an inverted V central portion providing positive cutting edges in continuation of the usual cutting edges of the drill and serving to extend the same to the actual axis of the drill.

Other objects of the invention include the provision of a method of grinding a twist drill or conventional or modified form so as to extend the cutting edges thereof to the actual axis of the drill; the provision of a method of grinding a drill so as to provide a uniform cutting clearance from the periphery of the drill to the axis thereof; the provision of a method of grinding a twist drill so as to provide an inverted V central area therefor serving to carry the cutting edges of the drill to the actual axis thereof; and the provision of a method of grinding a twist drill so as to provide an inverted V central portion therefor carrying the cutting edges of the drill to the actual center of the drill and providing an unusually large cutting angle at and adjacent the axis of the drill.

The above being among the objects of the present invention, the same consists in certain novel features of construction and combinations of parts to be hereinafter described with reference to the accompanying drawings, and then claimed, having the above and other objects in view.

In the accompanying drawings which illustrate suitable embodiments of the present invention and in which like numerals refer to like parts throughout the several different views, Fig. 1 is a fragmentary side elevational view of my improved drill illustrating the cutting end thereof;

Fig. 2 is an end view of the drill shown in Fig. 1;

Fig. 3 is a view similar to Fig. 1 but looking at the same in the direction of the arrow A in Fig. 2;

Fig. 4 is a perspective view of the end of the drill shown in the previous figures;

Figs. 5, 6 and 7 are fragmentary sectional views taken in planes parallel to the axis of the drill as on the lines 5—5, 6—6 and 7—7, respectively, of Fig. 2;

Fig. 8 is a partially broken plan view of a grinding apparatus suitable for grinding twist drills to provide the type of point thereon illustrated in the previous views, illustrating a drill in operative position with respect to the grinding wheel thereof;

Fig. 9 is a partially broken, partially sectioned fragmentary vertical sectional view taken on the line 9—9 of Fig. 8;

Fig. 10 is a fragmentary plan view illustrating the relation between the end of the drill and the grinding wheel during one phase of sharpening a drill by the apparatus illustrated in Figs. 8 and 9;

Fig. 11 is a fragmentary partially sectioned view taken on the line 11—11 of Fig. 10 to further illustrate the relationship between the drill and the grinding wheel;

Fig. 12 is a view similar to Fig. 11 but illustrating the relation of the drill point to the grinding wheel when the peripheral face of the grinding wheel is principally employed in the grinding operation instead of the axial face thereof as illustrated in Figs. 8 to 11, inclusive;

Fig. 13 is a view similar to Figs. 11 and 12 but illustrating the relationship between the end of the drill and the grinding wheel where a cup wheel is employed and its inner periphery is employed for determining the rake of the cutting edge; and, Fig. 14 is a view similar to Fig. 2 but illustrating the application of the invention to a drill of slightly different cross-sectional configuration.

It is generally known and also stated in technical handbooks that the power required to operate a twist drill as conventionally made today is about twice as much as the power required for a turning tool, as for instance, a lathe tool, in removing the same amount of stock in a given period. Experiments have shown that the higher power consumption in drilling operations as compared to other machining operations is to a great extent due to the high feed pressure required in drilling. Not only is such high feed pressure of disadvantage because of the higher power consumption required, but additionally such higher pressure causes undue wear of the drill point and sets up stresses in the drilling machine and the part to be drilled that is liable to be detrimental to the quality of the product.

The cause of the high feed pressure in drills of the conventional type is because of the form of the drill point. As may be observed on any conventional drill sharpened in the usual manner, there is no cutting edge at the center of the drill and adjacent thereto, and there cannot be a cutting edge as long as the point is positive in its nature and formed as parts of cones or truncated cones.

It is clear that a point on the circumference of a drill in operation describes a spiral with a lead equal to the feed per revolution. For an equal feed the helix angle of this spiral becomes smaller as the drill diameter increases and larger as the diameter of the drill decreases, and for a point at the center of the drill the helix angle becomes 90 degrees and in line with the direction of feed. It is obvious that a satisfactory clearance angle at the circumference of a drill for any given per revolution will cease to be a clearance at some point near the center of the drill where the drill is provided with a conventional positive or projected cone type of point. Similarly the top cutting rake resulting from the helix of the flute is positive as generally identified in the circumference of the drill but gradually is reduced as the center of the drill is approached and becomes negative as the so-called chisel point formed on the web of the tool between the flute is reached. This chisel point having neither top rake nor cutting clearance does not cut the material in the accepted meaning of the term but rather gouges or pushes the material out into the flutes of the drill.

The above described disadvantages of conventional types of twist drills is eliminated in accordance with the present invention by so forming the point of the drill as to carry the cutting edges thereof completely to the axis of the drill and providing a positive cutting clearance and rake for such cutting edges from the periphery of the drill to the actual axis thereof. In attaining the advantages of the present invention the cutting edge at the center of the drill is reversed from the conventional positive or projected cone and becomes a negative or depressed V. This makes it possible to present a cutting edge to the material from the outside of a cone formed by the depressed V and because it is cutting on the outside surface of a cone the end surface of the drill following the inverted V cutting edges may, theoretically at least, be disposed in a plane perpendicular to the axis of the drill and still provide the necessary cutting clearance for such cutting edges. The chips formed by this depressed cutting edge on the outside of the cone surface flow away more freely than the material that is gouged or pushed away by the conventional chisel point, operating inside of and at the bottom of a conical surface. This reversing of the point of the conventional drill enables a drill formed in accordance with the present invention to provide both rake and cutting clearance for the portion of the cut for which it is not possible to provide those features in conventional twist drills.

In tests made with drills ground in accordance with the present invention and having the above described depressed or inverted V points, it has been found that the feed pressure has been reduced as much as 44% in some cases and the torque reduced as much as 25% in some cases as compared to conventional drills operating in the same material and at the same speed and feed. These tests have also indicated that twist drills sharpened in accordance with the present invention will hold a satisfactory cutting edge for twice as long and longer than twist drills having the usually shaped points operating under the same conditions.

Referring now to Figs. 1 to 7, inclusive, a drill indicated generally at 18 is shown provided with a point constructed in accordance with the present invention. Although the present invention is applicable to drills having two or more lands and a corresponding number of flutes, the particular drill shown by way of illustration includes a main body portion providing two diametrically opposite flutes 20 diametrically disposed with respect to each other, and intervening lands 22, the flutes and the lands being arranged in conventional helical formation. Although the invention is equally applicable to lands having but a single margin, the drills shown in Figs. 1 to 7 for the purposes of illustration include a leading margin 24 and a trailing margin 26, the corresponding lands being cut away intermediate the margins 25 and 26 to provide the usual body clearance 28 therebetween. The use of double margins is preferred for the reason that the trailing margins 26 in the case illustrated are arranged substantially at 90° behind the corresponding leading margins and serve to steady the drill against any tendency to spring away from the wall of the bore being drilled, thus aiding in maintaining the bore being drilled in a straight line.

It will be noted from an inspection of Fig. 2 in particular that the shape of the flutes 20 shown are such that the cutting edges of the drill lie in a single plane including the axis of the drill, this construction being preferred in some instances although it will be appreciated that the trailing walls of the flutes 20 which form the cutting edge of the drill at the sharpened end thereof may be varied by being positioned at their side of a diametrical line so as to get a positive or negative lateral rake to the cutting edge, as compared to such diametrical line, depending upon the particular line of flow of chips desired by the designer or user, the drill of the present invention being capable of a wide variation in this respect the same as in conventionally pointed drills. As a matter of illustration in the modified form of drill shown in Fig. 14 the shape of the flutes is such as to give a negative lateral rake to the cutting edge.

Now it will be noted from an inspection of Figs. 1 to 4, inclusive, and particularly Fig. 2 that the point of the drill is made up of two surfaces, namely the surfaces 30. Each surface 30 is a generated surface formed by a line, such as the line B, intersecting the axis C of the drill and disposed at an angle, such as the angle D, to the axis of the drill equal to the point angle, and moved in a helical path about the axis of the drill as a center and at a helix angle equal to the clearance angle of the point with all points on the generating line moving longitudinally of the axis of the drill the same amount. In other words, the surfaces 30 and particularly that portion thereof trailing the radially outer or normally inclined portion of the cutting edges each comprise a part of a screw plane. It will be appreciated that due to this method of generating the surfaces 30 all points on the generating line will advance axially of the drill an equal amount during any particular angular movement of the line about the axis of the drill. Consequently, any point on such line, whether it be at the periphery of the drill, at the center of the drill, or any point therebetween, will advance the same distance axially of the drill during any revolution or part thereof of the drill. The cutting angle of the surface 30 at the periphery of the drill will be of a minimum value as compared to the cutting angle of any other point on the surface 30 between the periphery and the axis of the drill, it will increase uniformly from the periphery toward the axis of the drill and at the axis of the drill the cutting angle will be as close to 90° as practically possible, and it will be appreciated that this feature results in a theoretically as well as an actually most desirable condition. It permits the cutting angle of the drill at the periphery thereof to be maintained at a minimum value, thus leaving a maximum amount of body material in the drill to back up the cutting edges thereof, thus not only strengthening the cutting edges structurally but also aiding in carrying away the heat of the cutting operation therefrom.

Understanding that each of the surfaces 30 is generated by a helically moving line such as B passing through the axis C of the drill and disposed at an angle D to the axis equal to the point of angle of the drill, it will be appreciated that as the surface is generated the point of intersection of the line B with the axis C moves axially along the axis C of the drill and cuts away the central portion of the web of the drill. As a matter of fact this generating line B projects on both sides of the axis C of the drill and rotates through substantially 180 degrees of angular movement in the particular drill illustrated in Figs. 1 to 7, inclusive, to form each surface 30, so that it will be appreciated that by the time it has rotated a full 180 degrees of movement it will have cut away the central portion of the web so as to get a reversely angled cutting edge 34 over the central portion of the drill reversed in direction to the main or outer cutting edge 36 thereof, and the auxiliary cutting edge portions 34 of each surface 30 will combine to form an inverted V-shaped central point portion on the drill and each will extend completely to the axis of the drill. It may also be noted at this point that due to practical considerations in generation of the surfaces 30 by the method mentioned, the central portion of that part of the web being acted upon will be cut away during the generating step and will provide a surface 38, best illustrated in Figs. 6 and 7, lying substantially in a plane including the axis of the drill as well as the cutting edge 36 of the opposite land 22, thus providing the proper rake for the corresponding auxiliary cutting edge 34 formed on such opposite land in continuation of the main cutting edge 36 thereof. It will also be appreciated from the method in which the surfaces 30 are formed as above described that the width of the central inverted V formed by the two auxiliary cutting edges 34 will be dependent upon the point and cutting angles employed in the drill, the greater the cutting angle the wider the V and the smaller the point angle the deeper the V will be.

It might also be mentioned that that portion of each end surface 30 trailing the corresponding inner cutting edge 34 will not be in the same screw plane as that portion of the surface trailing the corresponding cutting edge 36. This is for the reason that the portion of the surface trailing the cutting edge 34 is generated by that portion of the generating line B which projects beyond the axis of the drill from that portion thereof which generates the portion of the surface 30 trailing the cutting edge portion 36 and from a generating standpoint is thus disposed at a reverse angle to a plane perpendicular to the axis of the drill as compared to that portion of the generating line B which forms that portion of the surface trailing the cutting edge 36. However, it will be appreciated that the portion of each surface 30 trailing the corresponding cutting edge portion 34 is still part of a generated screw plane and provides a cutting angle for the surface 34 commensurate with the cutting angle for the corresponding cutting edge 36 increasing in angularity towards the axis of the drill. The resulting effect is that, from an appearance standpoint, there appears to be a definite break in the surafce 30 where the two screw planes which go to make it up, join with each other. It will be observed that in the construction of the drill illustrated in Figs. 1 to 7, inclusive, the junction of the main cutting edges 36 with the corresponding auxiliary cutting edges 34 forms a relatively sharp point laterally offset from the axis of the drill. This sharp point will be obtained where the trailing edges of the flutes 20, which cooperate with the surfaces 30 to form the cutting edges 36, are such that a line included in either trailing surface and perpendicular to the axis of the drill intersects the axis of the drill as best illustrated in Fig. 2. Where such condition does not obtain and such line does not pass through the axis of the drill, as for instance in the case of the line E in Fig. 14, and which provides a negative lateral rake for the cutting edges, or in cases where such lines would lie on the opposite side of a diametrical line such as the line F to provide a positive lateral cutting rake for the cutting edge of the tool, the major and minor cutting edges 36 and 34, respectively, will be joined, when viewed as in Fig. 1, by a curved line as will be readily understood when considering the method of generating the surfaces 30.

A clear understanding of the exact nature of the formation of the cutting end of the drill may be obtained by an understanding of the method followed in forming such surfaces. Such understanding may be obtained from an explanation of Figs. 8 to 11, inclusive, and particularly Figs. 8 and 9 in which apparatus for forming the point is illustrated.

Referring to Figs. 8 and 9 the grinding fixture will be seen to include a base 40 upon which is mounted an electric motor 42 which supports and drives a grinding wheel 44. It may be noted that the grinding wheel 44 illustrated in Figs. 8 to 11, inclusive, is what is commonly known as a cupped wheel, that is it is formed in a more or less cup shape and in this case the edge of the open end of the cup is employed as the primary grinding surface. It may also be noted that the external surface of the wheel 44 in the case shown is not a true cylinder but is rather formed as a surface of a frustrum of a cone, this being for the purpose of obtaining the proper rake to the cutting edges of the drill as will be hereinafter more fully explained.

That portion of the fixture provided for supporting the drill to be sharpened includes a base 46 vertically adjustably mounted on an upwardly extending post 48 fixed to the base 40 in perpendicular relation to the plane of the upper surface thereof. The base 46 may be keyed to the post 48 to prevent relative rotation thereon, but preferably a stop such as 50 is provided in upwardly projecting relation upon the base 40 for engagement with the base 46 so as to enable the base 46 to be properly positioned angularly at all times upon vertical adjustment of the base 46 upon the post 48 and enabling the base 46 to be swung out of reach of the grinding wheel while loading or unloading a drill in the fixture.

Upon the sub-base 46 the drill supporting structure is received and this includes a supporting foot 60 and a pair of upwardly extending spaced walls 62 to the upper ends of which is fixed and on which is supported a sleeve member 64. The foot 60 is provided at its forward end with a longitudinally extending slot 66 therein in which a short post 68 is received and the position of which longitudinally of the slot 66 is controlled by means of a lock nut 70 cooperating therewith and bearing against the upper face of the foot 60. The lower end of the post 68 is provided with an axial opening therein in which a pin 72, fixed in the base 46, is rotatably received, this pin 72 providing a pivotal point for the foot 60 and the drill supporting and manipulating mechanism supported therethrough upon the base 46.

Rotatably and axially slidably received within the bore of the sleeve 64 is a second sleeve 76 the extent of axial movement of which within the bore of the sleeve 64 is controlled by means of a dog end screw 78 projecting through the sleeve 64 and the inner end of which is received in an annular slot or groove 80 in the periphery of the sleeve 76. The annular groove 80 is made of sufficient axial extent to permit the necessary axial movement of the sleeve 76 required during a grinding operation. A third sleeve 82 is axially slidably and rotatably received within the bore of the sleeve 76 and is adapted to be fixed in axially and rotatably adjusted position by means of a set screw 84 threaded through the rear end of the sleeve 76 and adapted to bear upon the periphery of the sleeve 82. Within the sleeve 82 is received a spindle member 86 which is solid throughout the greater part of its length but the forward end of which, where it is adapted to support a tapered shank drill, is provided with a tapered opening 88 therein for the reception of the tapered shank 90 of a drill, here illustrated as the same drill 18 as is shown in Figs. 1 to 7, inclusive. The rear end of the spindle 86 is provided with an internally threaded cup-shaped collar or sleeve 94 rotatably mounted thereon and maintained against axial movement thereon by means of a nut 96. This cup-shaped sleeve 94 is threadably engaged with the threaded outer surface of the rear end of the sleeve 82 so that upon rotation of the sleeve 94 with respect to the spindle 86 the spindle 86 will be further projected into or retracted from the sleeve 82 axially thereof and thus enable the drill 18 to be extended from or withdrawn into the sleeve 82 to a greater or lesser extent.

The forward end of the sleeve 76 is reduced in diameter so as to just clear the outer diameter of the largest drill 18 that the fixture is intended to receive.

In order to accurately center the drill in the sleeve 76 and also to locate the outer end of the drill angularly of its axis with respect to the sleeve 76 and the grinding wheel 44, a pair of longitudinally slidable keys 100 arranged on diametrically opposite sides of the sleeve 76 are provided in complementary forwardly and axially inwardly inclined openings in the extreme forward end of the sleeve 76. The forward or inner ends of the keys 100 are adapted to engage over and around the leading margins 24 of the drill 18 and are constantly urged into a projected and clamping relation with respect to the drill by means of a collar 102 slidably received on the reduced forward end of the sleeve 76 and partially projecting into the forward end of the bore of the sleeve 64. A coiled spring 104 maintained under compression between the rear end of the collar 102 and the shoulder formed at the junction of the reduced forward end of the sleeve 76 and the main body portion thereof constantly urges the collar 102 against the outer ends of the keys 100 and in turn constantly urges the keys 100 inwardly. The keys 100 may be released from the drill by manually retracting the collar 102 against the force of the spring 104. The forward end of the sleeve 76 is also provided with a pair of oppositely arranged screws 106 which are adapted to be received in the respective opposite flutes of the drill and acting against the leading surfaces of the flutes, press the margins 24 into contact with the keys 100 so as to positively position the drill angularly with respect to the sleeve 76.

The rear end of the sleeve 64 is reduced in diameter and rotatably receives thereon a cam member 110 which is fixed against axial movement thereon by means of a nut 112. The rear end of the sleeve 76 is likewise reduced in diameter and receives thereon an arm member 114 fixed against relative axial movement with respect to the sleeve 76 and carries an operating handle or knob 116 and a tracer point 118 which bears against the rear surface of the cam 110. The rear end of the bore of the sleeve 64 is enlarged and receives therein a coil spring 120 which is maintained under compression between the shoulder in the bore formed by such enlargement and the arm member 114 so as to constantly urge the arm member 114 and consequently the sleeve member 76 rearwardly in the bore of the sleeve member 64. Preferably, a light metallic sleeve member 122 fixed to the arm member 144 concentrically with the various sleeves is relatively closely but slidably received in the enlarged bore in the rear end of the sleeve 64 to serve as a dust shield to prevent dust or other abrasive or foreign material from finding its way into the bearing surfaces between the sleeves 64 and 76. Likewise, a ring member 124 is secured to the forward end face of the sleeve 64 and is provided with a groove on the inner peripheral surface in which a ring of felt 126 or other suitable resilient material is received in partly compressed state about the collar 102 to seal the forward end of the bore of the sleeve 64 against the entrance of foreign material.

This cam member 110 is rotatably adjustable about the axis of the sleeve 64 and locked in adjusted position by the following means. A bracket 128 is fixed to the forward face of the cam 110 and is provided with a forwardly extending lug 129. As best shown in Fig. 8, the sleeve 64 is provided near its rear end with a pair of angularly spaced outwardly projecting bosses 132 between which the lug 129 projects. A screw 134 threaded through each of the bosses 132 bears at its inner end on the lug 129. Adjustment of the screws 134 acts through the lug 129 to turn the cam 110 on the sleeve 64 and to lock it in such adjusted position.

From the foregoing it will be appreciated that if the lock nut 84 is tightened up so as to secure the sleeve 82 against movement with respect to the sleeve 76 and the arm member 114 is rotated by the operator grasping the knob 116 and turning it about the axis of the sleeve, the drill 18 will also be rotated therewith. At the same time, if the rear of operative face of the cam 110, over the area at which the tracer point 118 contacts therewith, is arranged in the spiral path, the sleeves 76 and 82 and spindle 86 together with the drill 18 will be moved axially as the tracer point 118 moves over such surface. If the lead of the cam surface over which the tracer point 118 moves is equivalent to the lead desired for the surface 30 on the end of the drill, then as the tracer point 118 is pressed against the cam surface and moved around it the drill 18 will be rotated and moved axially at the same time so as to cause the lead of the surface 30 or of the generating line B therefor to be moved at the desired helix angle with respect to the face of the grinding wheel 44.

In the particular cam 110 shown which is designed for a two flute drill, each half of the operative face thereof is provided with a plurality of different cam tracks 130 each formed as a substantially semi-annular surface and each surface is arranged with a different helix angle or lead, and the knob 116 and tracer point 118 are adjustable radially of the arm 114 in a slot 162 provided therein so as to enable the tracer point to engage any one of the surfaces 30. This feature enables the device to be readily adjusted to provide for grinding the end of the drill to provide the surface 30 at any desired cutting angle. The high points of all of the surfaces 130 on each half of the cam 100 are arranged in radial alignment with each other and in the same plane, the radially inner surface 130 being preferably provided with the smallest lead or helix angle and the radially outermost surface preferably being provided with a greatest lead or helix angle. As best illustrated in Fig. 8, the low point of each of the surfaces 130 in each path of the cam terminate in a shoulder 164 which is disposed at an angle to the axis of the various sleeves and of the drill 18, equal to or greater than the top rake angle desired for the finish drill point.

The pivotal position of the foot 60 and the drill supporting and manipulating mechanism carried thereby on the base 46 about the axis of the pin 72 determines the angularity between the axis of the drill 18 and of the grinding wheel 44 and consequently the point angle of the drill corresponding to the angle D in Fig. 1. This angularity is controlled in the following manner. A coiled spring 140 is maintained under tension between one of the legs 62 of the foot 60 and an upstanding flange 142 running along one side of the base 46 as best illustrated in Fig. 8. Rearwardly from the point of connection of the spring 140 with the flange 142 a screw 144 is threaded through the flange 142 and its inner end abuts the side of the foot 60 and consequently the spring 140 constantly urges the foot 60 into contact with the inner end of the screw 144. As will be obvious, by threading the screw 144 inwardly or outwardly the angularity between the axis of the drill 18 and of the grinding wheel 44 may be varied to suit the angularity of the particular drill point desired. The screw 144 may be locked in adjusted position by means of the lock nut 146.

In order to initially position the pointed end of the drill 18 with respect to the operative face of the grinding wheel 44 the following described mechanism is provided. The upper end of the post 68, as best illustrated in Fig. 9, is cut out or bifurcated to form the same into a yoke and one end of a gauge arm 150 is received between the opposite ends of such yoke and pivotally secured therein by means of the pin 152. The arm 150 is of such length that when it is swung up into a vertical position as illustrated in dotted lines in Fig. 9 its free end just clears the periphery of the grinding wheel 44. This end of the gauge arm 150 is machined to provide a rearwardly facing V-groove 154 at its outer end in which the point of the drill 18 is adapted to be received for longitudinal initial positioning movement. The depth of the V 154 is preferably such that when the arm 150 is in the position indicated in dotted lines in Fig. 9 and the end of the drill is projected into contact with the opposite walls thereof, the point of the drill is positioned for substantially proper grinding relation with respect to the operative cutting face of the grinding wheel 44. To provide an adjustment in this respect, it will be noted from an inspection of Fig. 9 that the arm 150 is of less width than the width of the slot in the upper end of the post 68 so that the arm 150 may slide axially on the pin 152 for a limited distance. A stop screw 156 is threaded through the rear wall of the yoke and its inner end is adapted to abut the pivoted end of the arm 150 and control the axial position of the arm 150 on the pin 152 so that the position of the arm 150 with respect to the operative face of the grinding wheel 44 may be varied. Such adjustment of the screw 156 may be fixed by means of a lock nut 158 threaded thereon and adapted to bear against the yoke end of the post 68. Where wear or dressing of the operative face of the grinding wheel 44 requires readjustment between a drill and the grinding wheel, or between the fixture and the grinding wheel, this may be compensated for by loosening the lock nut 70 on the post 68 and sliding the foot 60 on the post 68 longitudinally of the slot 66 a sufficient distance to compensate for the wear or dressing of the wheel and then again locking the foot 60 in position by means of the lock nut 70. On the other hand, the motor 42 and grinding wheel 44 may be mounted for adjustment axially of the motor as a unit to obtain the same effect.

In grinding a drill such as the drill 18 by the apparatus described the following procedure is followed, considering that the drill 18 is not mounted in the position shown in Figs. 8 and 9. The angle at which it is desired to grind the point of the drill is first determined and the screw 144 adjusted to conform. The base 46 is then swung about the axis of the post 48 to withdraw the drill holding part of the fixture out of adjacent relationship to the grinding wheel 44. The collar 94 is next threaded off the outer end of the sleeve 82 and is withdrawn with the spindle 86 from the sleeve 82. The drill 18 is then inserted in the end of the spindle 86, the spindle 86 is returned to the interior of the sleeve 82 and the collar 94 is threaded a few turns upon the rear end of the sleeve 82. Where a straight shank drill is employed the drill may be inserted directly into the front ends of the sleeves 76 and 82 without removing them from the fixture. The arm 50 is next raised to vertical position, and the set screw 84 is released from the sleeve 82 and the sleeve 82 together with the spindle 86 and the drill 18 is then shifted longitudinally or axially of the sleeve 76 until the point of the drill is properly received within the V 154 of the arm 150 and the set screw 84 is then tightened up to lock the sleeves 76 and 82 against relative movement, after which the arm 150 is dropped to inoperative position. In inserting the drill 18 through the forward end of the sleeve 76 the keys 100 are caused to engage over the primary margin of the drill 18 and the set screws 106 are then tightened down into the flutes so as to cause the drill 18 to be turned so as to bring the margins 24 up against the inner ends of the keys 100 and therefore properly locate the drill angularly with respect to the sleeve 76.

The above described engagement of the keys 100 with the margin 24 of the drill 18 will, when the tracer point 118 is positioned at the low point of the cam surfaces 130, positions the cutting edges of the drill 18 in a substantially horizontal plane parallel to the plane of the base 46. The base 46 may then be swung back into engagement with the stop 50 and be raised or lowered if required so as to bring the axis of the drill 18 flush with the lowermost point of the grinding wheel 44 and then the tracer point 118 may be adjusted in the slot 132 of the operating arm 114 to bring it into engagement with a particular cam surface 130 corresponding with the cutting angle of the surfaces 30 desired in the finished product, and the cam member 110 may be turned by the screws 134 to properly correlate the cutting edges of the drill 18 with the lower edge of the wheel 44 where this has not already been done.

With all the parts arranged as thus described it will be understood that the lower forward corner of the grinding wheel 44 simulates a horizontal line intersecting the axis of the drill and corresponds with the generating line B described in connection with Figs. 1 to 7, inclusive, and if now the grinding wheel 44 is caused to rotate and the knob 116 of the operating arm 114 is pressed against the particular cam surface 130 selected and started from the high point of the cam and caused to follow such surface around to the low point of the cam, the drill 18 will be caused to advance axially according to a lead of the particular cam surface 130 employed and at the same time will be rotated through 180 degrees in the particular construction shown and such lower forward edge of the grinding wheel 44 will have a relatively bodily spiral advancing movement with respect to the axis of the drill and will cause the corresponding end surface 30 of the drill to be formed.

When the tracer point 118 reaches the low point of the cam and the drill has been turned through approximately 180 degrees of movement the drill will be in the position illustrated in Figs. 10 and 11 in which the lower peripheral portion of the grinding wheel 44 will have substantially touched the trailing edge of the flute forming the forward face of the other cutting edge of the drill and preferably actually removes a slight amount of material from such face of the flute to provide the proper top rake angle for the drill. In the construction shown it will be apparent that this top rake angle corresponds to the half-angle of the cone of which the surface of the grinding wheel 44 constitutes a part and, accordingly, that by changing the conical angle of the periphery of the grinding wheel 44 this top rake angle may be varied as desired.

The drill 18 may then be withdrawn in an axial direction and the next surface 30 ground in the same manner as described, but it will be apparent that if the drill was withdrawn axially and without any turning movement on the part of the drill, the frusto-conical formation of the grinding wheel 44 would grind away the forward face of the cutting edges and provide a top rake angle of zero degree. This is particularly apparent from an inspection of Fig. 11. It is for this reason that the shoulder 164 provided at the low points of the various cam surfaces 130 is disposed at the angle illustrated in Fig. 8, so that in withdrawing the tracer point 118 along the surface or shoulder 164, a slight rotational movement will be given to the drill 18 and thus withdraw the drill 18 from the grinding wheel 44 in such a manner as to retain the top rake angle formed on the drill during the above described operation.

It will, of course, be possible to remove only the usual amounts of metal from the end of the drill 18 during each pass thereof over the grinding wheel and, accordingly, it will be necessary to advance the drill after each pass over both surfaces 30. This is readily accomplished after each pass by simply turning the collar or sleeve 94 on the rear end of the sleeve 82 to advance the spindle and consequently the drill 18 axially of the sleeve 82 the amount desired for the next pass.

From the foregoing it will be understood that once the mechanism described has been adjusted to bring the drill 18 into a position for an initial operation, the knob 116 of the operating arm 114 is pressed inwardly to bring the tracer 18 against the desired cam surface 130 and is then employed to turn the arm 114 and consequently the sleeves 76 and 82 and the spindle 86 and the drill 18 and at the same time advance the drill axially into contact with the wheel; the movements of the tracer 118 under such circumstances being from the high point of one of the cam surfaces 130 to the low point thereof, axially rearwardly along the corresponding surface 164, then down around the other corresponding cam surface 130 and up the corresponding shoulder 164, followed by an advance of the drill by movement of the sleeve 94 and repetition of the above described operation until the point of the drill has been ground to a sufficient extent.

Referring now to Figs. 10 and 11 and particularly to Fig. 10 it will be understood that the drill 18 is shown at the end of a grinding or sharpening operation on one of the surfaces 30, that is, at the time the tracer point 118 has reached the low point of one of the cam surfaces 130 but before it has been withdrawn in an axial direction along the corresponding surface 164. It will be understood that at the beginning of this particular grinding operation under consideration the drill was turned 180 degrees from the position shown and the cutting edge 36a was on the opposite side of the axis of the drill from the position shown and in contact with the forward edge face of the grinding wheel 44, and that as the drill 18 was turned and axially advanced from such position the surface 30 following the cutting edge 36a was being ground. Because of the axial advancement of the drill 18 during the rotation thereof the opposite cutting edge 36b was also axially advanced and turned until at the completion of the 180 degrees of movement the cutting edge 36b was projected underneath the periphery of the wheel as illustrated in Fig. 10 and the surface of the flute 20 serving as the forward face of the cutting edge 36b was preferably slightly ground by the grinding wheel 44. During this movement the axial face 30 for the auxiliary cutting edge 34a was, of course, ground but the grinding wheel did not remove any stock from the drill on the angle of the cutting edge 34a. Instead the wheel 44 removed stock from the web of the drill to form the contour of the angular cutting edge 34b. That portion of the web of the drill eventually going to form the auxiliary cutting edge 34a would not be removed until the drill was operated through the second stage of grinding necessary to grind the surface 30 following the cutting edge 36b. In other words during a grinding operation on the half of the drill including the cutting edge 36a the central web portion of the drill is cut away at an inverted angle over the extent of the auxilary cutting edge 34b, the auxiliary cutting edge 34a being cut away at the proper negative angle during the next one-half rotation of the drill. It will, of course, be appreciated that before the surface 30 following the cutting edge 36b is ground, when the drill and grinding wheel are in the positions illustrated in Fig. 10, the drill 18 must be withdrawn axially to bring the cutting edge 36b into alignment with the forward or operative face of the grinding wheel 44 before such operation is commenced, and after such operation is completed the cutting edge 36b will then be rotated into a position corresponding with the position of the cutting edge 36a shown and the cutting edge 36a will be rotated to a position corresponding with the position of the cutting edge 36b shown.

Fig. 11 further illustrates the manner in which the cutting edges 34b and 36b are brought under the periphery of the grinding wheel 44 at the completion of the grinding operation on the surface 30 following the cutting edge 36a, to cut away a portion of the web of the drill and a portion of the trailing surface of the corresponding flute 20 to provide the desired top rake angle for the cutting edges 34b and 36b. Also as illustrated in Fig. 11 the peripheral surface of the grinding wheel 44 is dressed at an angle E with respect to the axis of the drill 18 and consequently when it grinds the leading faces of the cutting edges 34b and 36b it automatically provides them with the top rake angle equivalent to the angle E.

In drills having an exceptionally thick web and correspondingly shallow flute particularly as found in the smaller sizes of drills, for instance drills of a diameter of one-eighth of an inch and under, it is often desirable to relieve the web back of the auxiliary cutting edges to a greater extent than that provided for by the normal sharpening described in order to permit the chips from the central portion of the drill to flow away more easily from the center portions of the cutting edges. This may be readily accomplished by the apparatus disclosed in Figs. 8 and 9 in the following manner. The drill is brought to the relative position illustrated in Figs. 10 and 11 with respect to the grinding wheel 44, that is with the cutting edges on one side of the drill immediately underlying the lower surface of the grinding wheel 44, and then the foot 60 together with the drill supporting apparatus and the drill supported thereon is pivoted in a clockwise direction about the axis of the pin 72 and against the tension of the spring 140. As will be appreciated from an inspection of Fig. 10 this simply rounds off the web of the drill 18 due to engagement thereof with the axial face of the grinding wheel 44, this relieving depending in its extent upon the amount of pivotal movement imparted to the foot 60 and drill 18 and grinding away the material of the web of the drill back of the corresponding auxiliary cutting edge 34. This operation is purely a relieving operation and although it may modify the true screw plane contour of that portion of the surfaces 30 trailing the auxiliary cutting edges 34, it accentuates and does not detract from the uniform cutting clearance which these portions of the surfaces 30 provide for their respective cutting edges 34 and simply provides more room for the chips to flow away from the auxiliary cutting edges 34. Accordingly, it will be understood that in the following claims where reference is made to the surfaces 30 as being formed as a part of a screw plane or as providing a uniform cutting clearance for the corresponding cutting edges, it will be understood that this expression embraces the surfaces 30 whether they are relieved in the manner mentioned or otherwise to obtain an equivalent effect.

The radius of this relieved portion will, of course, depend upon how far the forward end of the drill projects beyond the axial line of the pin or post 72, and this, as previously described, may be varied by threading the screw 156 inwardly or outwardly to shift the position of the locating arm 150 on its supporting 152 so as to vary the initial location of the drill being ground.

As previously stated it is not necessary that the axial end face of the grinding wheel be employed to simulate the generating line B for the surfaces 30. In the arrangement illustrated in Fig. 12 the drill is arranged with its axis in approximately perpendicular relationship with respect to the periphery of the grinding wheel 44a and in this case it is the forward peripheral edge of the grinding wheel, here indicated as 44a, which is employed to simulate the generating line D. The axis of the drill is disposed at an angle E' with respect to the forward face of the grinding wheel 44a equivalent to the top rake angle desired for the drill here indicated at 18a. It is understood that the same relative movement between the drill and the grinding wheel occur in this arrangement as occurs in the arrangement illustrated in Figs. 8 to 11, inclusive. It might also be noted that while the grinding wheel 44a illustrated in Fig. 12 is shown as of a frusto-conical type, this is not necessary inasmuch as a true cylindrical wheel will effect the same results when the axis of the drill is varied to correspond. However, in such case in order to get the proper top rake angle for the cutting edges of the drill, the face of the wheel will have to be cut back on an angle to permit this effect to be obtained.

In Fig. 13 an arrangement similar to that illustrated in Figs. 8 to 11, inclusive, is illustrated except for the fact that it is the inner peripheral edge or corner of the cupped wheel that is employed for cutting purposes and as simulating the generating line B instead of the outer peripheral edge or corner. The recess in the grinding wheel, here illustrated at 44b, in this case must be tapered axially outwardly and radially inwardly toward the open end of the recess in order to provide the desired top rake angle here illustrated as at E".

Reference has already been made to Fig. 14 and the modified form of drill section there shown. As previously mentioned in this modified form of drill the major cutting edges here illustrated at 36' and formed by the trailing surfaces of the flutes 20' do not lie in a plane including the axis of the drill but instead are offset from such axis, in the case shown in a direction to provide a negative lateral cutting rake to the drill. The minor cutting edges 34', however, both lie in a plane including the axis of the drill and both extend completely to the axis so that in this modified form of construction the drill is provided with cutting edges which extend from its periphery to its axis the same as in the drill 18 previously described. It will be obvious that the only difference from a practical standpoint is that the corresponding major and auxiliary cutting edges do not lie in the same plane but from an operating standpoint this has no practical effect on the functioning of the invention. One thing may be noted, however, that in a drill of the section shown in Fig. 14, the drill will be turned through a full 180 degrees during each grinding operation in spite of the fact that the main and auxiliary cutting edges are disposed at a smaller angle with respect to each other, this being necessary because in any event the auxiliary cutting edges 34' must extend to the axis of the drill and in a two flute drill both must lie in a plane including the axis of the drill. It might also be noted that the drill shown in Fig. 14 is provided with a leading margin 24', corresponding to the margin 24 in the drill 18 previously described but is devoid of any trailing margin such as the margin 26 in the previously described construction, the drill thus following conventional practice more closely than the drill previously described. This variation in construction has, of course, no effect on the application of the present invention to drills of this general type.

It will be appreciated from the foregoing that by varying the point angle and the cutting angle of a drill ground by the method disclosed herein the inverted V portion of the cutting edges may be varied in length in a generally radial direction from a minimum in which they may be almost imperceptible to a maximum in which they constitute substantially the entire cutting edges of the drill, thus affording great latitude in this direction to meet any desired condition. Furthermore, regardless of the proportional lengths of the inverted portions and normally disposed portions of the cutting edges, the cutting edges always extend substantially completely to the axis of the drill and are always provided with the proper cutting angle to obtain clearance over their full lengths.

Formal changes may be made in the specific embodiment of the invention described without departing from the spirit or substance of the broad invention, the scope of which is commensurate with the appended claims.

What I claim is:

1. A twist drill the cutting end surfaces of which comprise portions of screw planes the axes of which are substantially parallel with the axis of the drill.

2. A fluted drill having at least one cutting edge extending from the periphery of the drill completely to the axis thereof, the lip clearance angle of the end surface of the drill following said cutting edge increasing uniformly from the periphery of the drill to the axis thereof.

3. A twist drill having a plurality of cutting edges each extending from the periphery of the drill to the axis thereof, each cutting edge comprising a radially outer portion arranged in converging relation with respect to the axis of the drill in the direction of feeding movement of the drill and a radially inner portion arranged in converging relation inclined with respect to the axis of the drill in a direction opposite to the direction of convergence of the first mentioned portion with respect to the axis of the drill.

4. A twist drill having a plurality of cutting edges each extending from the periphery of the drill to the axis thereof, each cutting edge comprising a radially outer portion arranged in converging relation with respect to the axis of the drill in the direction of feeding movement of the drill and a radially inner portion arranged in converging relation inclined with respect to the axis of the drill in a direction opposite to the direction of convergence of the first mentioned portion with respect to the axis of the drill, the end surfaces of the drill following each of said cutting edges each comprising a part of a screw plane.

5. A twist drill having a plurality of cutting edges each extending from the periphery of the drill to the axis thereof, each cutting edge comprising a radially outer portion arranged in converging relation with respect to the axis of the drill in the direction of feeding movement of the drill and a radially inner portion arranged in converging relation inclined with respect to the axis of the drill in a direction opposite to the direction of convergence of the first mentioned portion with respect to the axis of the drill, each of said cutting edges having a positive top rake over the entire length thereof.

6. A twist drill having a plurality of cutting edges each extending from the periphery of the drill to the axis thereof, each cutting edge comprising a radially outer portion arranged in converging relation with respect to the axis of the drill in the direction of feeding movement of the drill and a radially inner portion arranged in converging relation inclined with respect to the axis of the drill in a direction opposite to the direction of convergence of the first mentioned portion with respect to the axis of the drill, the actual cutting clearance of each of said cutting edges being uniform over substantially the entire length thereof.

7. A fluted drill having a plurality of cutting edges each comprising a radially outer portion arranged in converging relation with respect to the axis of the drill in the direction of normal feeding movement of the drill and a radially inner portion arranged in converging relation to the axis of the drill inclined in a direction opposite to the direction of convergence of the first mentioned portion with respect to the axis of the drill, both the outer and inner portions of each cutting edge being formed by an end surface of the drill forming part of a single screw plane and intersecting a surface of a cooperating flute.

8. A fluted twist drill having a plurality of cutting edges, each cutting edge lying substantially entirely in a plane including the axis of the drill and each cutting edge comprising an outer portion arranged in converging relation with respect to the axis of the drill in the direction of normal feeding movement of the drill and an inner portion arranged in converging relation with respect to the axis of the drill inclined in a direction opposite to the direction of convergence of the first mentioned portion with respect to the axis of the drill.

ERIK E. HALLDEN.

CERTIFICATE OF CORRECTION.

Patent No. 2,334,089. November 9, 1943.

ERIK E. HALLDEN.

It is hereby certified that error appears in the printed specification of the above numbered patent requiring correction as follows: Page 2, first column, line 28, after the word "given" insert --feed--; and second colond column, line 49, for "their" read --either--; page 6, second column, line 33, after "initial" insert --grinding--; and that the said Letters Patent should be read with this correction therein that the same may conform to the record of the case in the Patent Office.

Signed and sealed this 4th day of January, A. D. 1944.

(Seal)

Henry Van Arsdale,
Acting Commissioner of Patents.